(12) United States Patent
Curtis

(10) Patent No.: US 11,978,160 B2
(45) Date of Patent: May 7, 2024

(54) GPU-BASED DIGITAL MAP TILE GENERATION METHOD AND SYSTEM

(71) Applicant: Daniel E. Curtis, Davenport, FL (US)

(72) Inventor: Daniel E. Curtis, Davenport, FL (US)

(*) Notice: Subject to any disclaimer, the term of this patent is extended or adjusted under 35 U.S.C. 154(b) by 27 days.

(21) Appl. No.: 17/822,185

(22) Filed: Aug. 25, 2022

(65) Prior Publication Data
US 2023/0065027 A1 Mar. 2, 2023

Related U.S. Application Data

(60) Provisional application No. 63/221,287, filed on Jul. 13, 2021.

(51) Int. Cl.
*G06T 17/05* (2011.01)
*G06T 15/00* (2011.01)

(52) U.S. Cl.
CPC ............ *G06T 17/05* (2013.01); *G06T 15/005* (2013.01)

(58) Field of Classification Search
CPC ...... G06T 11/206; G06T 15/005; G06T 17/05
See application file for complete search history.

(56) References Cited

U.S. PATENT DOCUMENTS

| | | | |
|---|---|---|---|
| 5,030,117 A | 7/1991 | Delorme | |
| 8,872,848 B1 | 10/2014 | Appleton | |
| 9,404,759 B2 | 8/2016 | Kalai et al. | |
| 9,424,673 B2 | 8/2016 | Otero et al. | |
| 9,940,743 B1 | 4/2018 | Umare et al. | |
| 10,140,680 B2 | 11/2018 | Patel et al. | |
| 10,378,909 B2 | 8/2019 | Gonopolskiy et al. | |
| 10,936,920 B2 | 3/2021 | Pylvaenaeinen et al. | |
| 11,042,961 B2 | 6/2021 | Brown et al. | |
| 11,062,506 B2 | 7/2021 | Lauritzen et al. | |
| 11,145,105 B2 | 10/2021 | Surti et al. | |
| 2010/0321399 A1 | 12/2010 | Ellren et al. | |
| 2015/0269770 A1* | 9/2015 | Jenkins | G06T 15/20 345/421 |
| 2016/0275920 A1* | 9/2016 | Apodaca | G06T 15/40 |
| 2019/0213784 A1* | 7/2019 | Schmalstieg | G06T 15/005 |
| 2020/0320776 A1* | 10/2020 | Doyle | G06T 15/10 |
| 2020/0388022 A1 | 12/2020 | Bourd et al. | |
| 2021/0178274 A1 | 6/2021 | St-Pierre et al. | |
| 2021/0199444 A1 | 7/2021 | Xie et al. | |
| 2021/0263853 A1 | 8/2021 | Waters et al. | |
| 2021/0390664 A1 | 12/2021 | Pohl et al. | |
| 2022/0068013 A1 | 3/2022 | Kozlowski et al. | |

\* cited by examiner

*Primary Examiner* — Ming Wu
(74) *Attorney, Agent, or Firm* — Dunlap Bennett & Ludwig, PLLC; Anna L. Kinney

(57) ABSTRACT

A method of generating map images in a computing device includes loading source map data or vector data onto a host; loading an output tile system; determining which output tiles to process by cross-referencing the source map data or the vector data with the output tile system; loading source maps or vector data to a graphics processing unit memory; executing a graphics processing unit kernel to process data and return a map tile to the host; writing the map tile to a file on a database; determining if all tiles have been processed; and generating output map tiles. A map tile generation system includes computing devices; servers connected via a network; non-transitory computer-readable storage media storing instructions and machine-learning graphics processor units coupled to the servers via a kernel interface program.

20 Claims, 4 Drawing Sheets

GPU-BASED DIGITAL MAP TILE GENERATION METHOD AND SYSTEM

CROSS-REFERENCE TO RELATED APPLICATION

This application claims the benefit of priority of U.S. provisional application No. 63/221,287, filed Jul. 13, 2021, the contents of which are herein incorporated by reference.

BACKGROUND OF THE INVENTION

The present invention relates to digital map tile generation and, more particularly, to a graphics processing unit (GPU)-based digital map tile generation method and a system therefor.

Digitally stored electronic maps can be used to display geographic or location-based information to users of mapping programs or applications. These mapping applications often utilize a grid-based arrangement of map data, referred to herein as map tiles, to organize and display map data.

Each map tile may correspond to a portion of a geographic map. For example, a map tile may correspond to a square area of a geographic map at a particular zoom level, or an area of a pre-defined size and location within a geographic map. Levels may include a local level (e.g., a single tile), a cluster level (e.g., neighboring tiles), and a global level (e.g., all files or an entire map). Map tiles may contain geometry data describing features of the geographic map, such as roads, buildings, borders, bodies of water, parks, etc. Additionally, map tiles may contain data describing these features, such as names, labels, style data for renderers, risk level, or other information. Such data can be stored as metadata separately from the features or as additional features. Each feature corresponds to at least a cluster of neighboring pixels in a map tile. Each pixel can have one or more values associated with different features. Thus, a geographic map may correspond to many map tiles, and each map tile may contain a large amount of data.

Preparing aviation map overlays for use in mapping software is slow and very hardware intensive. Using smaller map segments allows for better performance, lower bandwidth use, and faster rendering times. The process of importing multiple larger map overlay files, stitching them together, and generating millions of smaller segments or tiles can take days, even weeks using traditional central processing unit-(CPU) based technologies. This means that a certain amount of time is always required to generate and process maps for digital use on client devices with every update and/or change made to the source. Currently available processes use CPU based solutions to generate their map tile sets. They are inherently slow, as the CPU can only process a single pixel of each map tile at a time, increasing energy consumption and slowing down development time.

In addition to regular map data, interactive mapping systems may also provide functionality for other graphics to be displayed on top of or composited with the regular map data. Two examples are the vector graphics of polygons and polylines. Vector graphics are specified by vectors of vertices. With respect to map data, the vertices correspond to map locations, which can be specified by map coordinates. For example, a straight line drawn between two locations can define the edge of a polyline.

A polyline is formed by drawing straight lines connecting successive vertices. A polygon can be formed by drawing a further straight line between the first and last coordinates, thereby forming a closed shape. The inside region of polygons can include visual indicators, e.g., a shading or color, to indicate a particular closed-off region.

These vector graphics can include thousands of vertices. Consequently, rendering these vertices and connecting edges can require significant processing power. In some implementations, a server renders the vector graphics and then serves the rendered image to the client browser.

As can be seen, there is a need for a faster method of generating map tile sets.

SUMMARY OF THE INVENTION

In one aspect of the present invention, a method of generating map images in a computing device comprises loading source map data; loading an output tile system; determining which output tiles to process by cross-referencing the source map data with the output tile system; loading source maps to a graphics processing unit memory; executing a graphics processing unit kernel operative to process data and return a map tile to a host; writing the map tile to a file on a database; determining if all tiles have been processed; and generating output map tiles.

In another aspect of the present invention, a method of generating map images in a computing device comprises loading vector data onto a host; loading an output tile system; determining which output tiles to process by cross-referencing the vector data with the output tile system; loading vector data onto a graphics processing unit memory; determining if all tiles have been processed; executing a graphics processing unit kernel operative to process data and return a tile; returning a tile data from the graphics processing unit to a host; writing a file; determining if all tiles have been processed; and generating output tiles.

In another aspect of the present invention, a map tile generation system comprises one or more computing devices; one or more servers coupled to the one or more computing devices via a network; one or more non-transitory computer-readable storage media coupled to the one or more servers and storing instructions which when executed cause one or more processors to perform a method of processing input files; and one or more machine-learning graphics processor units coupled to the one or more servers via a kernel interface program operative to accept the input files, determine output images, load corresponding data onto the one or more machine-learning graphics processor units, and execute programs to output resulting data to an image or to stream resulting data to a request element; and configured to execute a method of generating map images in a computing device from a source selected from the group consisting of at least one source map; at least one vector datum; an input manifest; and any combination thereof.

These and other features, aspects and advantages of the present invention will become better understood with reference to the following drawings, description, and claims.

DETAILED DESCRIPTION OF THE INVENTION

Figure 1:
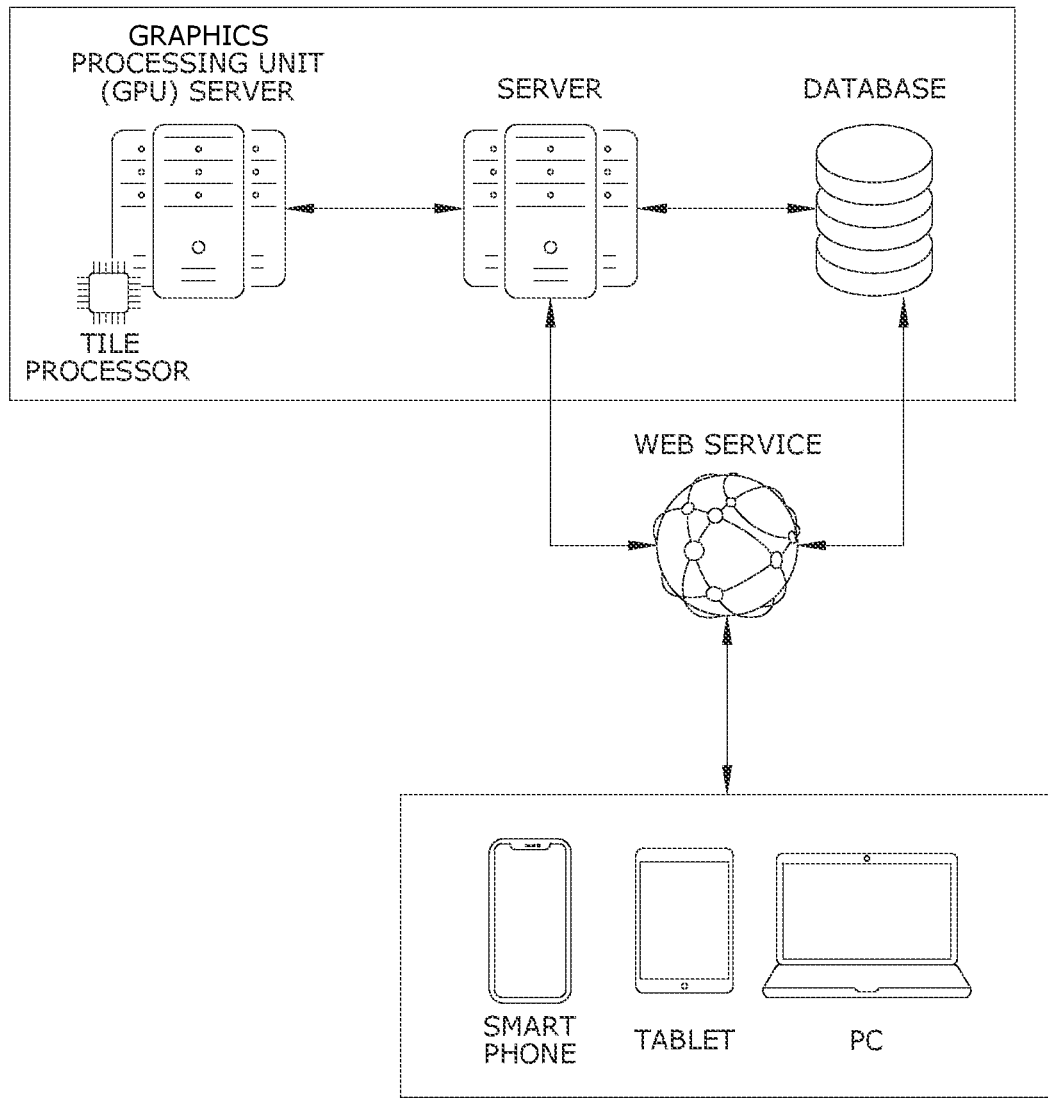
FIG. 1 is a block diagram of a digital map tile generation system according to an embodiment of the present invention.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, one embodiment of the present invention is a method and a graphics processing unit (GPU)-based system operative to quickly and efficiently generate and process map tiles, expediting map loading on a client device.

The system is operative to process hundreds of thousands of pixels at the same time, enabling very fast image generation of map tile sets, particularly in conjunction with intelligent memory management and stitching processes. The inventive system uses custom software and a high-performance, machine-learning GPU to generate a map tile set. Using the inventive software, once the GPU is configured, the user may generate a single tile in a fraction of a millisecond. This technology reduces the time to generate a map tile set from multiple larger maps from many hours, days, or weeks with currently available technologies to less than an hour.

The inventive method provides low-data full-scale mapping solutions to devices and is a very quick and efficient means of creating small, low file-size output tiles from large maps. The resulting small tiles may be requested as needed and maps may be rendered on devices that don't have the capability to load all the source mapping data to memory efficiently.

Input source maps may be very large in size (10 mbs, 100 mbs, 1 gb+ 100 gb+). The source maps, or a manifest thereof, and a tile system output specification may be analyzed to determine which tiles contain map data to be generated. Output tiles containing all relevant mapping information from the source images may be used to render the maps on devices in a tile format and/or structure. The specific steps of extracting information from the source maps to determine pixel data may vary depending on the input source, type, and/or image data; the selected output projection; and/or the selected means of stitching the maps together.

Once a tile has been generated and/or processed by the GPU device, the tile data may be written to a file system and included in a larger set for use later or it may be sent directly to the requesting party. For example, an http request sent to the core program requesting tile "z_y_x" for map set "visual flight rules (VFR)" may instigate loading of the information onto GPU memory to immediately handle the tile request and render the tiles as requested, rather than generating the complete set together. The method may be used to generate a complete map set such as United States (USA) VFR Map digital aeronautical charts, or it may be used to generate tiles for that set one at a time, upon request. To generate tiles one at a time on request, rather than in one bulk process, the data for the requested tiles may be loaded into the GPU memory. The data may be retained in the GPU memory for use if another tile is requested that requires the same source data as the original tile, making the subsequent tile request faster.

Without limiting the scope of the present invention, the GPU device may be used with source maps loaded onto its memory to generate output map tile set images and data.

The main program prepares work to be performed by the CPU and writes results from the GPU to the local (i.e., server) file system. The inventive process both supports the rendering of source maps comprising bitmaps or images to the output tile set and vector mapping data. The defining input manifest may specify geo vectors and colors, or each output vector, and the GPU may use this information to determine pixel colors "on the fly". This functionality may be used for radar and weather applications.

The inventive method may stitch together large map sets that cover portions of the globe to create a map tile set. The output map tile set may be loaded to a navigation application, a mapping application, and other geographic information system (GIS) services. For example, instrument flight rules (IFR) and visual flight rules (VFR) sectional charts provided by the Federal Aviation Administration (FAA) may be converted into a digital overlay map tile set for use inside of an Electronic Flight Bag (EFB) application. In another example, radar weather data may be converted into a vectorized map tile set that may be rendered in applications like those listed above. This is advantageous because it can improve the interoperability of radar data for some users and allows radar information to be updated more frequently while dramatically decreasing energy costs.

The inventive system comprises a computer with a machine learning GPU and utilizes a GPU kernel interfacing program that prepares source maps, loads them on the GPU memory, and a CPU sends a kernel to the GPU to be executed. The program quickly processes the source maps and returns tile image data to the calling process and either sends, streams, or writes the resulting data returned from the GPU to the client device. Processes that prepare source maps may be written and manifests may tell the map generation code how to generate the output map set. A program may be written to interface with the GPU that accepts the input files and manifests, determines requested output images, loads corresponding data onto the GPU, and executes kernels and programs to output resulting data to an image on, or streamed to, a request element. The program generates an 'output' manifest that tells the user (i.e., the person using the code or program that loads in the result) what tiles are available.

Vector-based source data that is not specific to mapping may be used with the inventive method, i.e., weather overlays, cloud overlays, wind information overlays, traffic pattern data, and ocean information vectors that change regularly. The necessary tiles may be output using vector-based source data, i.e., outputting a tile-based map derived from vector-based data rather than from large source maps. A vector-based bounding box using, for example, the North American Datum (NAD) and North American Vertical Datum of 1988 (NAVD 88) reference systems (e.g., top, right, bottom, left [90°, 180°, −90°, −180°]), may enable a mix of the vector and bitmap or image processes.

In some embodiments, the process may be performed without manifests, e.g., if the source maps cover the whole planet, or if the output maps are configured to cover the whole planet even if every tile does not contain data. The inventive method may also be used without an input or output manifest by using predefined level tile size definitions or standardized format input source maps that do not change. For example, a level-based definition may indicate level 1 has 4×2 tiles, each covering pre-defined distances. Using this definition, output tiles may be produced using a naming convention rather than using a manifest.

The process steps disclosed herein may be rearranged or configured differently from the exemplified order in some embodiments.

Referring to FIGS. 1 through 5, FIG. 1 illustrates a digital map tile generation system according to an embodiment of the present invention. A GPU server operates as a tile processor in conjunction with a host server and stores map data in a database. The requestor's device, such as a smart phone, tablet, or PC, interacts with the GPU server, host server, and database via a web service.

Figure 2:
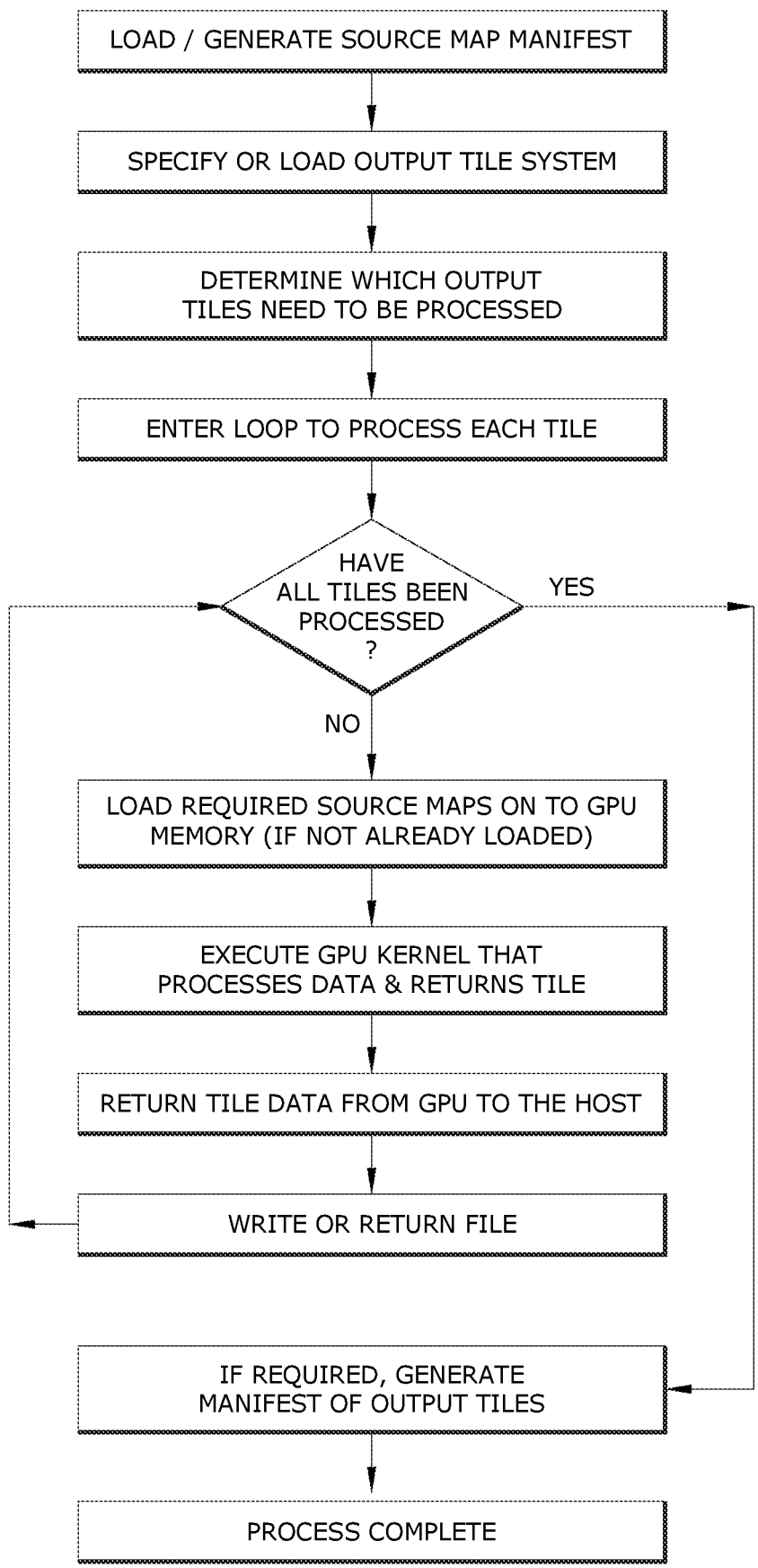
FIG. 2 is a flow chart illustrating a method of processing source maps according to an embodiment of the present invention.

FIG. 2 illustrates a method of generating tiles from source maps with a source map manifest, according to an embodiment of the present invention. The system may generate a manifest of source maps if one is not already available. The system may then load the source maps manifest. Similarly, the system may generate a manifest of an output tile set if one is not already available. The system may then load the output tile manifest.

In order to determine what tile images to process, the system may cross reference the source map manifest with the output tile manifest. Based upon that determination, the system may iteratively load corresponding source maps to GPU memory and process the loaded source maps to produce the predetermined map tiles. The system may execute a GPU-based kernel to process each pixel for each output tile image to generate output data and/or an image for each tile. The GPU-based kernel may also determine an output data array. The GPU device may return the tile data and/or image to a host device, e.g., a server. The generated tile may be written and/or streamed to an output location, whether a database or the requesting device. In some cases, a manifest may be generated of the output files.

Figure 3:
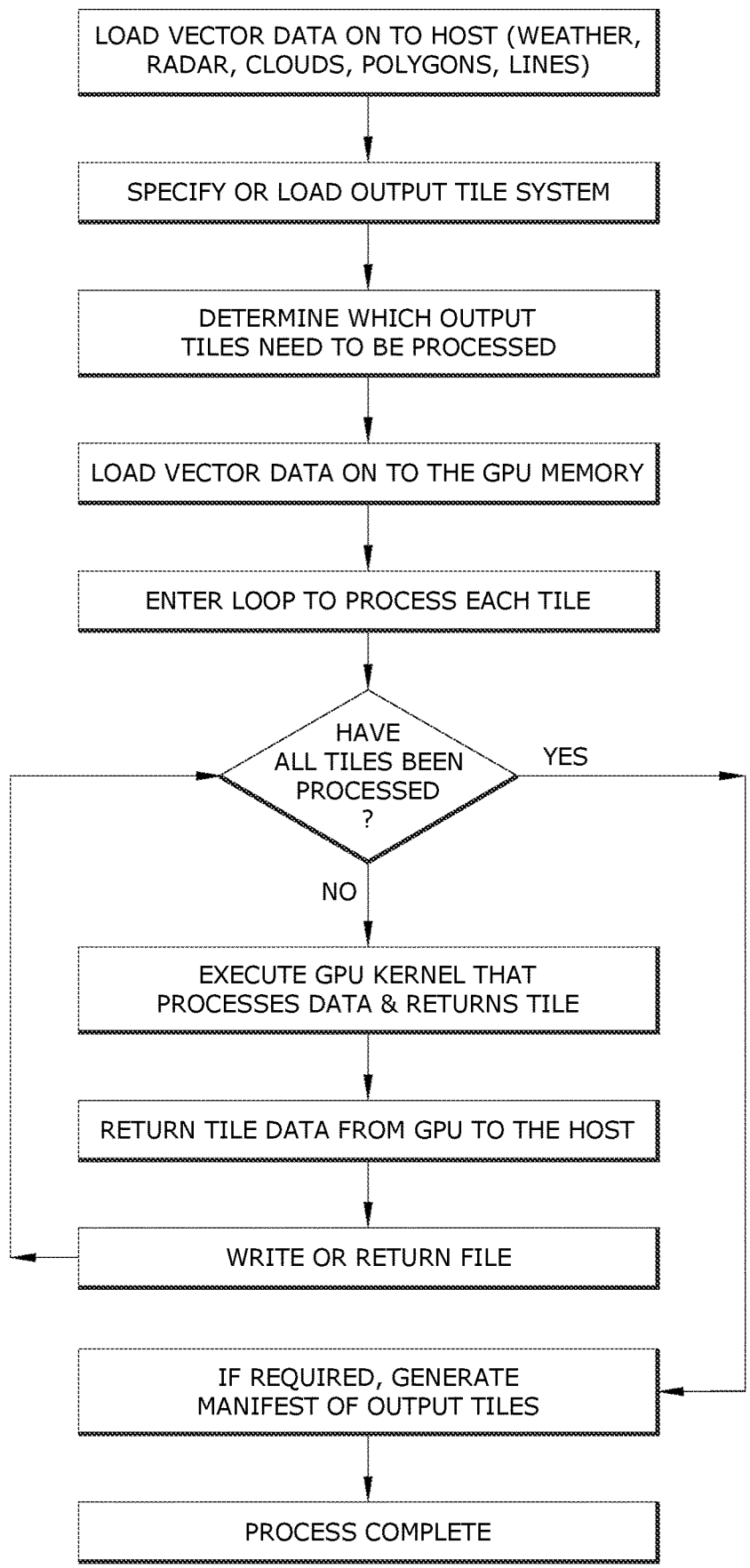
FIG. 3 is a flow chart illustrating a method of generating a tile set from vector source data according to an embodiment of the present invention.

FIG. 3 illustrates a method generating tiles from vector data according to an embodiment of the present invention. The vector data may include weather, radar, clouds, polygons, lines, and any combination thereof. Once the vector data is loaded to the host device (i.e., server), an output tile system may be specified or loaded, and the map tiles to be produced may be determined.

The system may load the data to the GPU memory and iteratively execute a GPU-based kernel to process the vector data and return an output tile data to the host. The generated tile may be written and/or returned to an output location, whether a database or the requesting device. In some cases, a manifest may be generated of the output tiles.

Figure 4:
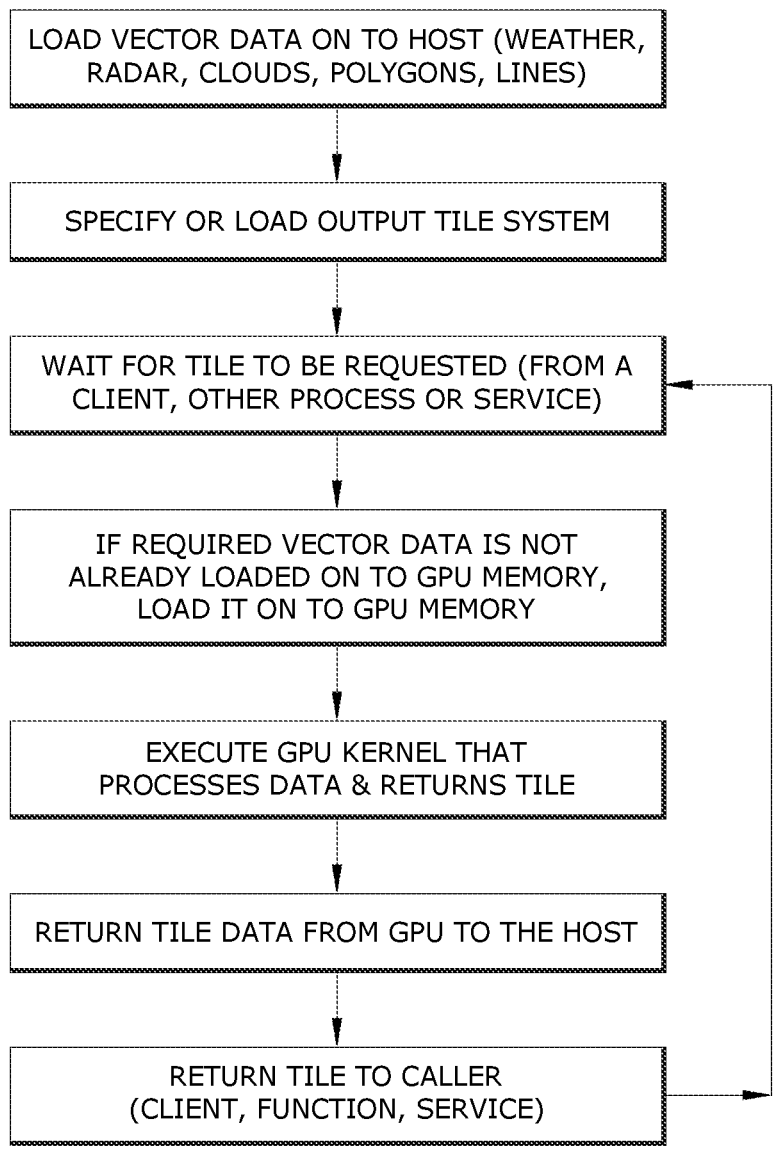
FIG. 4 is a flow chart illustrating a method of generating a tile set from vector source data according to another embodiment of the present invention.

As shown in FIG. 4, an alternative method may include pre-emptively loading the vector data to the host, specifying or loading an output tile system, and waiting for a tile to be requested by a caller, which may be a client, a function or other process, or a service. Once the request is received, the vector data may be loaded onto the GPU memory if it has not already been done, and a GPU kernel may be executed to process the vector data and return tile data, which may be returned to the host and from there to the caller.

Figure 5:
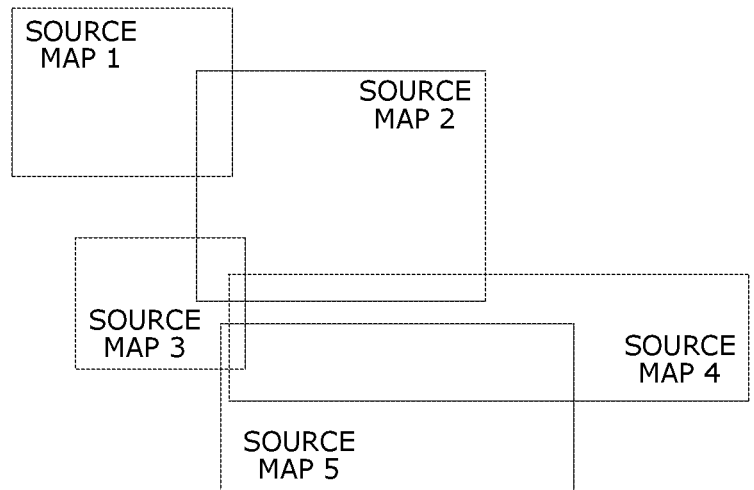
FIG. 5 is a schematic view of a map tile overlay produced thereby.

FIG. 5 illustrates the overlay regions across multiple source maps that may be generated as map tiles according to the present invention.

It should be understood, of course, that the foregoing relates to exemplary embodiments of the invention and that modifications may be made without departing from the spirit and scope of the invention as set forth in the following claims.

What is claimed is:

1. A method of generating map images in a computing device, comprising:
   a. loading source map data onto a host server;
   b. loading an output tile system onto the host server;
   c. determining which output tiles to process by cross-referencing the source map data with the output tile system;
   d. loading the source map data from the host server to a graphics processing unit memory;
   e. executing a graphics processing unit kernel operative to process the source map data; and
   f. generating and returning a map tile to the host server.

2. The method of claim 1, further comprising writing the map tile to a database.

3. The method of claim 1, further comprising determining if all the output tiles determined by step (c) have been processed.

4. The method of claim 1, further comprising generating a source map manifest prior to loading the source map data.

5. The method of claim 1, further comprising, prior to the step of loading the source map data from the host server to the graphics processing unit memory, determining if the source map data has previously been loaded onto the graphics processing unit memory; loading the source map data onto the graphics processing unit memory if not already loaded; and continuing to the step of executing a graphics processing unit kernel if the source map data has already been loaded.

6. The method of claim 1, further comprising generating an output map tile manifest prior to loading the output tile system.

7. The method of claim 6, further comprising cross-referencing a source map manifest with the output map tile manifest.

8. The method of claim 1, wherein the executing the graphics processing unit kernel comprises processing at least one pixel for the map tile and determining an output data array.

9. The method of claim 1, wherein the map tile is an image.

10. The method of claim 1, further comprising:
    streaming the map tile to an output location selected from the group consisting of: a file system; a client device; a navigation application; a mapping application; and a geographic information service.

11. A method of generating map images in a computing device, comprising:
    a. loading vector data onto a host server;
    b. loading an output tile system onto the host server;
    c. determining which output tiles to process by cross-referencing the vector data with the output tile system;
    d. loading the vector data from the host server onto a graphics processing unit memory;
    e. executing a graphics processing unit kernel operative to process the vector data; and
    f. generating and returning a map tile to the host server.

12. The method of claim 11, wherein the vector data is selected from the group consisting of weather, radar, clouds, polygons, lines, and a combination thereof.

13. The method of claim 11, further comprising waiting for a tile to be requested by a caller after loading the output tile system; and returning the map tile to the caller.

14. The method of claim 13, wherein the caller is selected from the group consisting of a client; a function; a service; another process; and a combination thereof.

15. The method of claim 11, further comprising writing the map tile to a database.

16. The method of claim 11, further comprising determining if all the output tiles determined by step (c) have been processed.

17. A map tile generation system comprising:
   a. one or more computing devices;
   b. one or more servers coupled to the one or more computing devices via a network;
   c. one or more non-transitory computer-readable storage media coupled to the one or more servers and storing instructions which when executed cause one or more processors to perform a method of processing input files selected from the group consisting of at least one source map; at least one vector datum; an input manifest; and any combination thereof; and
   d. one or more machine-learning graphics processor units coupled to the one or more servers via a kernel interface program operative to accept the input files, determine output images, load corresponding data onto the one or more machine-learning graphics processor units, and execute programs to output resulting data to an image or to stream resulting data to a request element; and configured to execute a method of generating map images in the one or more computing devices from the input files.

18. The map tile generation system of claim 17, wherein the one or more computing devices is selected from the group consisting of a smartphone; a tablet; a personal computer; and any combination thereof.

19. The map tile generation system of claim 17, wherein the generated map images are loaded to a device operating an application selected from the group consisting of: a navigation application, a mapping application, other geographic information system (GIS) services, and any combination thereof.

20. The map tile generation system of claim 17, wherein the input manifest specifies one or more characteristics selected from the group consisting of: geo vectors, colors, and output vectors; and determines pixel colors from the one or more characteristics.

* * * * *